United States Patent
Lapointe et al.

[15] 3,637,254
[45] Jan. 25, 1972

[54] WINDSHIELD CONSTRUCTION

[72] Inventors: Yves Anselme Lapointe; Guy Simard; Henri Emond; Pierre A. Delisle, all of Quebec, Canada

[73] Assignee: Bombardier, Limited, Valcourt, Quebec, Canada

[22] Filed: Apr. 8, 1969

[21] Appl. No.: 814,284

[52] U.S. Cl. ................................... 296/84, 180/5
[51] Int. Cl. ......................................... B60j 1/02
[58] Field of Search ............... 296/84, 90, 93, 78.1; 52/403, 52/717; 49/488, 489

[56] References Cited

UNITED STATES PATENTS

| | | | |
|---|---|---|---|
| 2,547,799 | 4/1951 | Wernig | 296/84 |
| 3,093,846 | 6/1963 | Reid | 9/1 |
| 3,369,836 | 2/1968 | Haycock et al. | 296/78.1 |
| 3,435,907 | 4/1969 | Imhoff | 180/5 |
| 3,213,584 | 10/1965 | Bush | 49/489 |

Primary Examiner—Benjamin Hersh
Assistant Examiner—Robert R. Song
Attorney—Larson, Taylor & Hinds

[57] ABSTRACT

A windshield made of a screen member normally of plastic material, mounting means formed of a rubber moulding strip disposed between the lower edge of the screen member and the body of the vehicle, and a series of fasteners mechanically interconnecting the screen member to the receiving surface of the body at spaced-apart locations along the lower edge of the screen member.

15 Claims, 7 Drawing Figures

PATENTED JAN 25 1972 3,637,254

WINDSHIELD CONSTRUCTION

This invention relates to such as used on relatively small vehicles, particularly snowmobiles and the like, wherein the wind screen element is preferably a sheet member made of plastic material capable of substantial elastic deformations. More particularly the invention relates to means adapted to retain the screen member of the windshield onto the body of the vehicle in question.

BACKGROUND OF THE INVENTION

In the field of small motorized vehicles having an open top cabin for example golf carts, snowmobiles, motorcycles and small boats, it is customary to provide an unbreakable windshield formed of a sheet of transparent plastic material and a suitable mounting means for retaining the screen on the body of the vehicle at a predetermined angle.

A prior screen mounting arrangement consists of a thin metallic rim encircling the screen member and secured to the receiving wall. Preferably, however, the rim which to a certain extent blocks the view of the driver and defaces the appearance of the windshield is omitted, and the wind screen is retained in place solely by means of mechanical fasteners such as bolts, rivets and the like which act upon the lower edge of the screen. In some cases a narrow metallic strip is applied against the lower portion of the screen under the heat portion of the fasteners, for the purpose of preventing tearing of the plastic sheet in the area surrounding the fasteners. However, this type of arrangement requires a small sloping formation extending across the upper portion of the nose of the vehicle, and presenting an inclined surface against which the bottom of the screen is fastened. The presence of such a surface across the nose of the vehicle and the fact that a series of mechanical fasteners must be disposed externally of the body of the vehicle are aesthetically objectionable and were found to greatly reduce the possibilities in design improvements.

The object of this invention is therefor to devise a means for mounting a screen member onto a thin-walled body, which does not necessitate an inclined surface as noted above, and in which visible mechanical fasteners can be avoided.

SUMMARY OF THE INVENTION

We have discovered that this object can be achieved by means of mounting means which incorporates a moulding strip adapted to receive the base of the screen member, which moulding strip is adapted to rest against the outside surface of the receiving wall; and mechanical fastening means whose head portion can be disposed within said moulding strip, such mechanical fastening means being adapted to retain said moulding strip between the lower edge of said screen member and the receiving wall.

We have, however, discovered that such an arrangement can easily be adapted in such manner as to provide a releasable windshield which when subjected to a more or less violent impact separates from the carrying surface, hence providing a safe practically unbreakable windshield. To this end the mounting means comprises at least two fasteners joining the base of the screen member and the receiving wall at spaced-apart locations thereof, each fastener comprising a head portion secured to the screen member and at least one leg portion connected with the head portion and bent against the inside surface of said receiving wall.

In particular we provide the combination of a rigid, thin sheet member capable of substantial elastic deformations, and mounting means used to retain the lower edge of said sheet member onto the receiving surface of a thin-walled body at a predetermined angle and along a given line of said surface, and acting upon said sheet member exclusively upon a relatively narrow band portion thereof adjacent said surface. The mounting means comprises a flexible moulding strip having an elongated, longitudinally extending slot adapted to receive at least a portion of said band portion of said sheet member, said moulding strip being adapted to rest upon said surface in a stable condition; and at least two mechanical fastening means interconnecting adjacent points of said sheet member and said receiving surface at spaced-apart locations along said given line in such a manner as to oppose any traction force of normal to said moulding strip and in the plane of said sheet member, which is less than a predetermined value. Each said fastening means comprises a head portion anchored onto said sheet member and disposed within the inside of said moulding strip, and at least one leg portion mechanically joined with said hear portion and projecting through the wall of said body, said leg portion being retained to said wall.

An embodiment of a windshield in accordance with this invention comprises a screen member made of transparent plastic material, a moulding strip made of rubber and adapted to receive the lower band portion of said screen member, a receiving surface on the body of said snowmobile, said receiving surface presenting a generally U-shaped formation curved across the upper portion of the snowmobile nose and defining the curvature of said band portion of said screen member, and mechanical fastening means acting upon said screen member and being anchored to the inside surface of the snowmobile nose. The said moulding strip is in the form of an elongated element having a generally constant cross section and comprises a lower portion adapted to be received in and to conform to said U-shaped formation and an upper portion integral with said lower portion and presenting a slot extending along the length of said element and corresponding generally to the length of said band portion of said screen member. The said moulding strip is at least partially hollow, with the inside thereof in communication with said slot thereby to permit said base portion of said screen member to be inserted into said moulding strip.

Preferably this fastening means is formed of a length of a sheet metal strip, of which the middle portion is adapted to be located in a perforation at said band portion of said screen member, with the lateral portions of each length being bent against said screen member towards the nearest edge thereof; the ends of said lateral portions projecting beyond said edge of said screen member through said moulding strip and through perforations in the bottom of said U-shaped perforation; and the projecting tips of said sheet metal strip being bend outwardly with respect to one another against the inside surface of said U-shaped formation.

The invention further provides a moulding strip for mounting a screen member at a predetermined angle on the outside surface of a receiving wall, said moulding strip being shaped as a elongated element having a generally constant cross section and comprising a lower portion integral with an upper portion along a longitudinal plane through said moulding strip; said lower portion comprising two lateral walls flaring outwardly and projecting towards said upper portion presenting an external surface which extends along the length of said moulding strip but which projects beyond said lateral walls whereby to overhand the sides of said lower portion, said external surface presenting an elongated and narrow slot which communicates with a relatively deep cavity within said elongated element whereby to enable the lower band portion of said screen member to be disposed within said moulding strip, the length and width of said slot corresponding generally to the associated dimensions of said base portion of said screen member.

We also provide a method of assembling a windshield on a snowmobile cowl comprising the steps of: inserting and holding the middle portion of a length of sheet metal strip in each perforation of the windshield screen member, said perforations being distributed along the base portion of said screen member, and folding the lateral portions of each length against the screen member towards the nearest edge of said screen member; inserting the base portion of said screen member in the receiving groove of a moulding strip with the ends of the lateral portions of said lengths projecting through the bottom of said receiving groove; disposing the assembly of said screen member, moulding strip and lengths of metal strip along a given line on the surface of the snowmobile cowl, with said lateral portions projecting through respective slots in the wall of said snowmobile cowl; and bending the tips of said lateral portions of each said length away from one another against the inside surface of the wall of said cowl.

DESCRIPTION OF A PREFERRED EMBODIMENT

Figure 1:
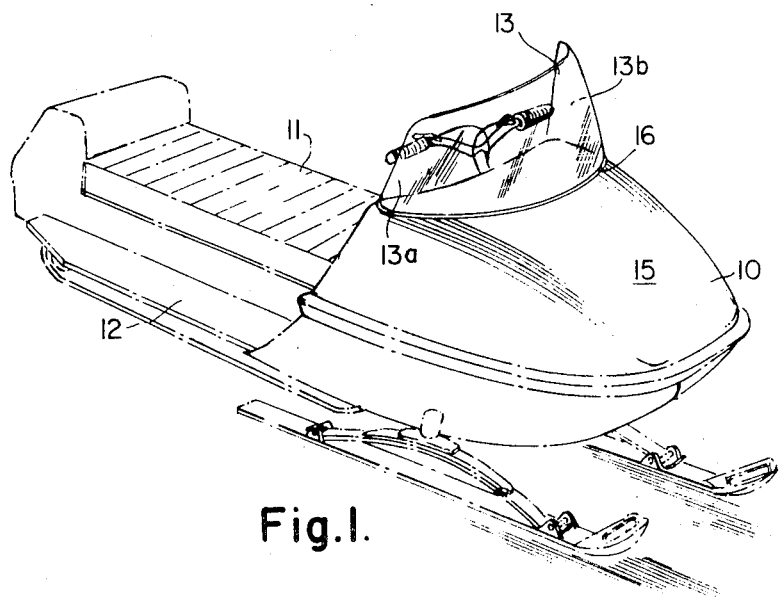
FIG. 1 is a perspective view showing a snowmobile provided with a windshield.

Referring to FIG. 1, reference numeral 10 indicates the nose portion or cowl of a snowmobile, behind which is provided a seat 11 supported longitudinally over the frame 12; and on the upper portion of cowl 10 a windshield 13 is shown which is curved at its base thereby forming lateral sides 13a and 13b. Windshield 13 is seated in a moulding strip 16 as will be described hereinafter in detail. The nose portion of the vehicle which encloses the engines, the transmission and the gas tank, may be of fiber glass or a suitable plastic material.

With reference to FIG. 1, it would seem that the mounting means for the screen of the windshield has no mechanical fastening means; it appears as if the screen member 13 was bonded or otherwise secured to moulding 16 along its lower edge. However, as shown in FIGS. 2 to 7, windshields in accordance with this invention have purely mechanical mounting arrangements consisting of a moulding strip and spaced fasteners.

Essentially, in accordance with this invention, the base portion of the screen member is received in a relatively narrow and deep cavity or groove in the moulding strip which in turn is retained between the lower edge of the screen member and the receiving surface by means of mechanical fasteners. It will become apparent that provided the moulding strip is stably held against the receiving surface and the groove in the moulding strip is sufficiently deep, the side portions of the moulding strip provide lateral support to the base portion of the screen member, while the mechanical fasteners hold the assembly together.

In order to increase the stability of the moulding strip and/or the depth of its groove without enlarging its outside dimensions, it has been found advantageous to sink the lower portion of the moulding strip in a U-shaped formation extending across the receiving wall as will be described in detail hereinafter.

Figure 2:
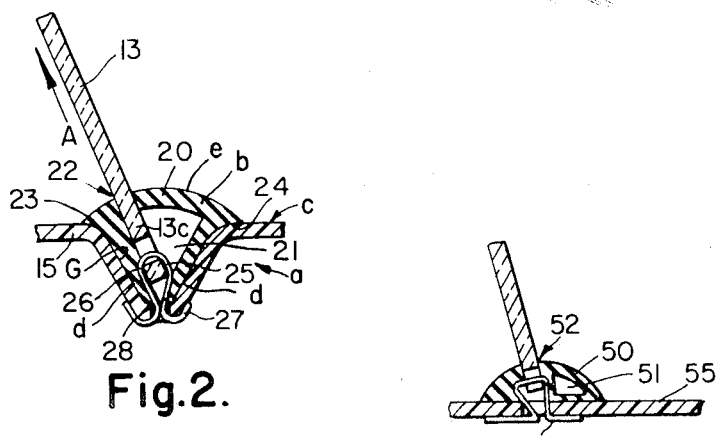
FIG. 2 is a cross-sectional view of part of a windshield in accordance with this invention at a point where a mechanical fastener is located.
Figure 3:
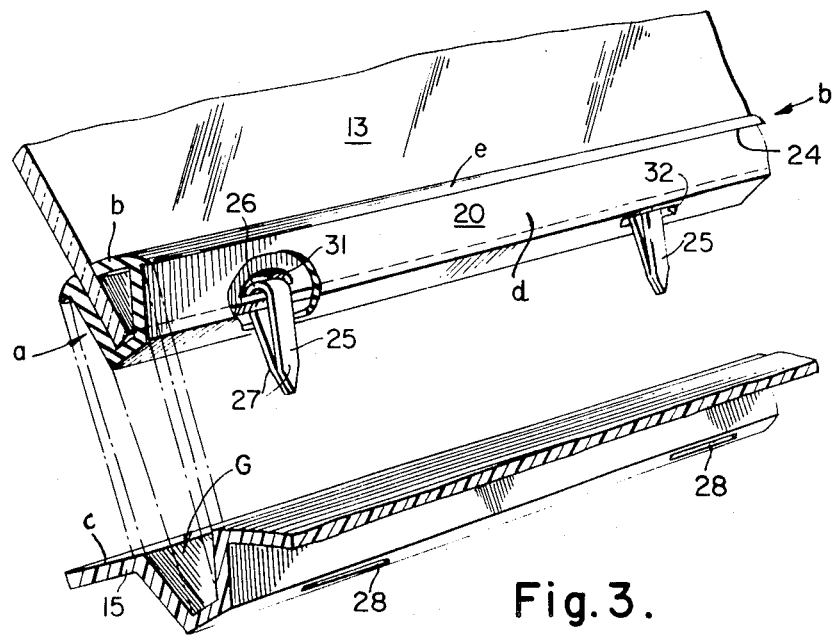
FIG. 3 is a partial exploded view of the embodiment of FIG. 2, as appears toward the last assembly step.

In FIGS. 2 and 3 a preferred embodiment is shown; the cross section represented in FIG. 2 is taken at one of the fasteners 25, and in FIG. 3 the partly exploded view illustrates a section of a windshield before the last assembly steps.

With reference to FIGS. 2 and 3 the illustrated embodiment comprises a portion of the receiving wall 15, which normally forms the upper and rearmost portion of the engine compartment cowl. Wall 15 as shown has a depression or U-shaped formation G which extends along the base of the windshield. A flexible moulding strip 20, preferably made of rubber, is stably mounted on the receiving surface of wall 15. In the present instance the bottom part of strip 20 is inserted in, and is conformed to, the U-shaped formation G of the receiving wall 15. In the top surface of moulding strip 20 a slot 22 is provided which communicates with a cavity 21. This opening or slot 22 in moulding 20 receives the lower band portion 13c of the screen member 13. The mounting means also incorporates mechanical features 25 (two being used in the section represented in FIG. 3) whose heads are received in an aperture 31 at the base or band portion 13c of the screen member 13. Each fastener 25 also has one or more legs 27 connected with the head portion 26, and legs 27 are adapted to engage the inside surface of wall 15, preferably in a releasable manner.

Moulding strip 20 is in the form on an elongated element of generally constant cross section, as is better shown in FIG. 3. When adapted to be mounted on a wall 15 having a U-shaped formation as in FIG. 2, moulding strip 20 incorporates a lower portion *a* integral with an upper portion *b* along a longitudinal plane which normally corresponds with that of receiving surface *c* of wall 15. The lower portion *a* of strip 20 has two lateral surfaces *d* projecting upwardly towards the upper portion *b*. Said lateral surfaces may also project outwardly as seen in FIGS. 2 and 3 to conform to the shape of the formation G in wall 15. The upper portion of the moulding strip 20 which projects above the receiving wall 15 presents an external surface *e* which is the only visible surface of the mounting arrangement of FIG. 2. Surface *e* normally extends along the entire length of the base of the windshield 13, and is slightly wider than the mouth of the U-shaped formation G in wall 15. As noted above, a narrow slot 22, which receives the base portion of screen member 13 divides the external surface *e* along its length. The dimensions of opening or slot 22 should conform to the related dimensions of screen member 13 for a sufficiently close fit. On each side of slot 22, external surface *e* may be curved downwardly to taper the opposite lateral edges 23 and 24 which overhand lateral surfaces *d*. As a result, edges 23 and 24 form thin sealing lips which rest upon the edges of surface *c* of receiving wall 15.

A cavity 21 in communication with slot 22 extends longitudinally of moulding strip 20 for the purpose of defining a relatively deep channel capable of receiving the lower band portion 13c of screen member 13 as well as spaced-apart fasteners, 25. Cavity 21 may advantageously be made larger than necessary as this is found to greatly facilitate assembly.

As noted above, the moulding strip 20 is held against the receiving surface, i.e., between the lower portion of screen member 13 and wall 15, by means of two or more fasteners 25 disposed at regular intervals along the base of the windshield. In the embodiment illustrated in FIGS. 2 and 3 each fastener 25 is made of a length of narrow metallic ribbon or strip folded in a U-shape with its middle portion 26 disposed in one of perforations 31 that are provided in the base portion 13c of screen member 13. The lateral portions 27, which bear against the sides of screen member 13, and project beyond the nearest edge thereof, define a pair of legs 27. As shown in FIG. 2, legs 27 extend through the bottom of moulding strip 20 and pass through a slot 28 in the bottom of formation G, and their tip portions are bent around the bottom of formation G. In order to facilitate insertion of legs 27, the blanks which are used to form fasteners 25 are cut at an angle, and the bottom of moulding strip 20 is provided with spaced-apart longitudinal slits 28 for legs 27.

Hence, FIG. 2 shows a windshield wherein the mounting arrangement acts exclusively upon the lower band portion of the screen member. Specifically, the screen member is held in a predetermined upright position on a receiving wall by the combined action of a moulding strip which provides lateral support, and mechanical fasteners which prevent withdrawal of the screen member from the groove of the moulding strip and which also indirectly hold moulding strip against the receiving wall, i.e., in the bottom of its U-shaped formulation. By reason of the fact that the mechanical fasteners 25 interconnect the screen member 13 and the receiving wall 15 in a releasable manner, the windshield of FIGS. 2 and 3 can yield to sufficiently high impacts and thereby reduce the possibility of hurting the driver of the vehicle. In face, a force directed longitudinally on the vehicle and acting upon the upper central section of windshield 13 should create a force of traction in the direction of arrow A (FIG. 2), acting upon the wing portions 13a and 13b of the screen member 13. Should this force exceed a predetermined safe level, legs 27 of these fasteners will slip out of their respective slots 28, thereby allowing screen member 13 to pivot about its median portion; it may also happen that the entire base of the screen member 13 comes off the vehicle cowl. As should be apparent, replacement of the windshield assembly requires no special skill and necessitates no particular tools.

The mounting arrangement thus far described results in a safe windshield which is virtually unbreakable. Such a windshield is of particular advantage in snowmobiles because of the inherent instability of such vehicles especially when operated in deep snow. However, the invention is by no means limited to this particular application. It should in face find numerous applications in the fields of small open top vehicles such as boats, motorcycles and others.

The arrangement illustrated in FIGS. 2 and 3 has also been found to be of particular interest to mass produced vehicles on account of its inherent ease of assembly. Specifically, the method of assembly comprises the steps of placing the middle portion of a metallic ribbon blank 25 in each aperture 31 at the bottom edge of the screen member; folding the lateral portions of the blank to form a U-shaped fastener, inserting the bottom edge of the screen member in the groove of a moulding strip 20 with fasteners 25 in place and with leg portions 27 projecting through the bottom of the moulding strip; disposing the screen member, moulding strip, and fastener assembly on the receiving surface, specifically in the U-shaped formation G, and bending the protruding tips of legs 27 against the inside surface of the receiving wall, i.e., the underside of formation G. The upper portion of FIG. 3 shows the above noted screen member, moulding strip and fastener assembly before being inserted in the formation G of wall 15, shown in the bottom portion of FIG. 3. In order to facilitate insertion of legs 27 into slots 28 it may be advantageous to make slots 28 considerably larger than the width of legs 27, as is shown in FIG. 3.

Figure 4:
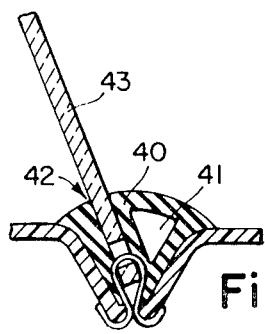
FIG. 4 is a cross-sectional view illustrating a slightly different moulding strip.

It should be apparent that the invention is not limited to the particular moulding strip configuration illustrated in FIGS. 2 and 3. For example, FIG. 4 shows in cross section a slightly different shape which serves the same function as moulding strip 20 of FIG. 2. Moulding strip 40 incorporates a relatively deep, elongated screen receiving groove 42 which is separated from cavity 41 by a thin wall 44. Alternatively, cavity 41 may be omitted if it is desired to provide a more rigid construction as seen at 60 in FIG. 6.

Figure 5:
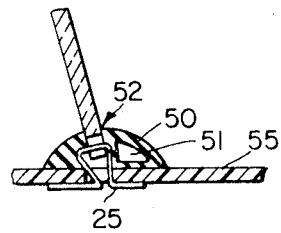
FIG. 5 shows a flat moulding strip in cross section.

The invention also applied to windshields mounted on a flat receiving surface, i.e., one which does not have a U-shaped formation or groove for receiving the bottom part of the moulding strip. The moulding strip in such a case has a relatively wide flat bottom surface. An exemplary embodiment is illustrated in FIG. 5 wherein the flat receiving wall is referred to by reference numeral 55. The flat bottom moulding strip 50 incorporates a relatively deep, elongated groove 52 which corresponds to and has the same function as groove 42 as shown in FIG. 4. Hence, the lower band portion of screen member 53 is inserted in groove 52 and is held in place by means of a mechanical fastener 25. In order to render the moulding strip 50 somewhat more flexible, a cavity 51 extending longitudinally of the body of strip 50 may be provided at one side of groove 52 as shown in FIG. 5.

Figures 6, 7:
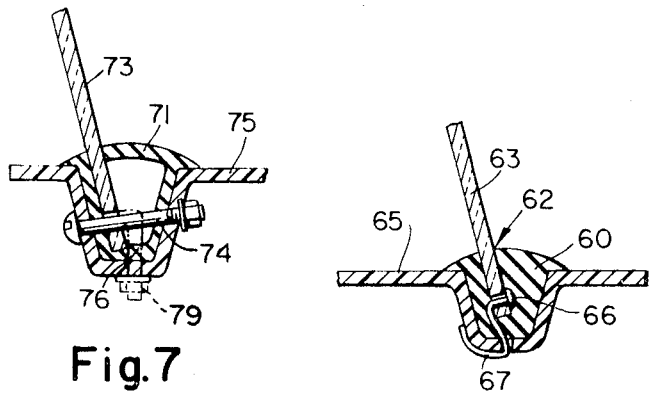
FIG. 6 is a cross-sectional view representing a solid moulding strip with a one-leg fastener.
FIG. 7 shows, in cross section, a moulding strip similar to that of FIG. 2 but associated with two possible types of threaded fasteners.

The mechanical fastener thus far described is made of a piece of metallic ribbon or strip folded in a U-shaped configuration to provide a head portion 26 which is confined to an aperture in screen member, and two generally parallel side-by-side leg portions 27. In FIG. 6, however, a different mechanical fastener is shown which incorporates an enlarged head portion 66 from which depends a relatively long leg portion 67. Assembly with such fasteners may be effected by slipping the leg portions 67 through the apertures in screen member 63 until the head portions 66 abut against one of the sides of screen member 63. Then the moulding strip 60 is mounted on the base of screen member 63 by inserting the lower band portion of the screen member in groove 62, with the leg portions 67 projecting through the bottom of groove 62. Thereafter, the moulding strip 60 is seated in the U-shaped formation of receiving wall 65, and the terminal portions of legs 67 which pass through an aperture in the bottom of the formation are folded against the inside surface of wall 65 i.e., around the bottom of the U-shaped formation thereof as shown in FIG. 6.

In FIG. 7 a further embodiment of this invention is shown wherein the mechanical fasteners used are of the nonreleasable type. Specifically a transverse bolt 74 is shown which is threaded through successive perforations across the U-shaped formation in wall 71, the sidewalls of the lower part of the moulding strip 75, and the base of screen member 73. It will be apparent that with this arrangement tearing of the screen member 73 in the vicinity of fasteners 74 would take place before fasteners 74 came undone, but this feature may be desirable in certain applications. For instance in securing the screen member of a substantially planar windshield it may be unnecessary to provide releasable attachments since the screen member, if subjected to a force along the longitudinal axis of the vehicle, is free to bend or pivot around its base as a result of compression of the upper portion of the moulding strip 71.

An alternative permanent fastener 76 is represented in FIG. 7 in phantom line. Fastener 76 is an L-shaped metallic rod, threaded at the end of its longer arm for receiving a nut 79. Such a fastener could be easier to install than transverse bolt such as fastener 74 because the apertures through which its lower threaded portion is adapted to extend, are necessarily in line with one another.

It should be understood that the cross-sectional configuration of the lower portion of a moulding strip for mounting on a grooved receiving surface, as is described hereinbefore in relation with FIGS. 2, 3, 4, 6, and 7, is not necessarily shaped as a flat bottom surface with two outwardly flaring walls. The important thing is that the lower portion of the moulding strip conforms as closely as possible to the surface of the groove of the receiving wall to ensure a stable support. It follows therefore that the inner surface of the groove G and the outside surface of the lower portion of the moulding strip could have a wider or narrower, flat or curved, bottom than that shown in FIGS. 2, 4, 6 and 7 with parallel or more or less diverging upstanding surfaces. The flat bottom, open U-shaped configuration shown in the accompanying drawings is found advantageous when applied to mass production because of the possibility of using wider tolerances.

The embodiment shown in FIGS. 2 and 3 is found to produce satisfactory results when applied to fiber glass snowmobile cowl, with a screen member 13 made of transparent plastic sheet material of a thickness of 0.08 inch, in a U-shaped formation G seven-eighths inch deep with vertical outwardly directed walls spaced three thirty-seconds of an inch at the base and five-eighths of an inch at the top. A total 9 fasteners are used, equally spaced along the base of the screen member; each fastener is made of 3-inch long blank of five-sixteenths of an inch wide strip of mild steel, 0.036 inch think.

When the screen member used is relatively thin, for example of the order of one-twelfth of an inch, it may become necessary to provide a protective element disposed around the outer periphery of the screen member for the purpose of preventing tearing of the screen member and/or to convey to the windshield additional rigidity. To this end a small C-shaped channel (not shown) may be affixed to the edge of the screen member either by friction or by bonding. Satisfactory results have been obtained with an edge protector made from a thin metallic strip about three-quarters of an inch wide embedded in a thin plastic covering, the assembly being folded along its length to thus form an elongated C-shaped channel. For better frictional engagement the inside surface of the edge protector may be provided with one or more longitudinal ribs.

It should also be understood that the present invention is not limited to moulding strips which are made of rubber material. Certain synthetic plastic or rubberlike materials of a suitable resiliency can be substituted for rubber.

We claim:

1. Means for mounting a screen member onto a receiving surface at a given and substantial angle with respect thereto and along a predetermined line on said surface, comprising a striplike member adapted to rest against said surface along said predetermined line, said striplike member including a groove for receiving an edge of said screen member to position said screen member in mounted position on said receiving surface at said substantial angle relative thereto, and means to mount said striplike member on said surface, said means including mechanical fastening means extending through the bottom edge of said screen member and the bottom of said groove of said striplike member and adapted to retain said screen member in mounted position in said groove extending at said substantial angle relative to said surface and to retain said striplike member between the bottom edge of said screen member and said surface.

2. Mounting means for retaining a screen member on the receiving wall of a body at a given angle, said mounting means acting solely upon a narrow band portion of said screen member at one of its edges, and comprising a striplike member of flexible material and mechanical fastening means extending through said striplike member and adapted to retain said striplike member between said one edge of said screen member and said receiving wall; said striplike member being in the form of an elongated body having a relatively deep and narrow groove along the length of said body for receiving said narrow band; said screen member having a series of spaced apart perforations at said band portion for receiving therein said mechanical fastening means, said fastening means including a head portion is disposed within said striplike member, the end of said fastening means opposite said head portion extending through the bottom of the groove of said striplike member and being releasably connected to said wall of said body.

3. The combination of a rigid, thin sheet member capable of substantial elastic deformations, and mounting means used to retain the lower edge of said sheet member onto the receiving surface of a thin walled body at a predetermined angle and along a given line of said surface, and acting upon said sheet member exclusively upon a relatively narrow band portion thereof adjacent said surface; the said mounting means comprising a flexible moulding strip having an elongated longitudinally extending slot adapted to receive at least a portion of said band portion of said sheet member, said moulding strip being adapted to rest upon said surface in a stable condition; and at least two mechanical fastening means interconnecting adjacent points of said sheet member and said receiving surface at spaced-apart locations along said given line in such a manner as to oppose any traction normal to said moulding strip and in the plane of said sheet member, which is less than a predetermined value; each said fastening means comprising a head portion anchored onto said sheet member and disposed within the inside of said moulding strip, and at least one leg portion mechanically joined with said head portion and projecting through the bottom of said moulding strip and the wall of said body; said leg portion being retained to said wall.

4. The combination defined in claim 4 wherein the leg portion of each fastening means extends through the bottom of said moulding strip, with the tip of said leg portion passing through a narrow perforation in said wall and being bent against the inside surface of said wall.

5. The combination defined in claim 4 wherein each fastening means incorporated two leg portions which extend through the bottom of said moulding strip and through said wall; said legs being bent in opposite direction with respect to one an other and against the inside surface of said wall.

6. A windshield for snowmobiles, comprising a screen member made of transparent plastic material, a moulding strip made of rubber and adapted to receive the lower band portion of said screen member, a receiving surface on the body of said snowmobile, said receiving surface presenting a generally U-shaped formation curved across the upper portion of the snowmobile nose and defining the curvature of said band portion of said screen member, and mechanically fastening means acting upon said screen member and being anchored to the inside surface of the snowmobile nose; the said moulding strip being in the form of an elongated element having a generally constant cross section and comprising a lower portion adapted to be received in and to conform to said U-shaped formation and an upper portion integral with said lower portion and presenting a slot extending along the length of said element and corresponding generally to the length of said band portion of said screen member; the said moulding strip being at least partially hollow, with the inside thereof in communication with said slot thereby to permit said base portion of said screen member to be inserted into said moulding strip.

7. The windshield defined in claim 7 wherein said fastening means is formed of a length of sheet metal strip, of which the middle portion is adapted to be located in a perforation at said band portion of said screen member, with the lateral portions of each length being bent against said screen member towards the nearest edge thereof; the ends of said lateral portions projection beyond said edge of said screen member through said moulding strip and through perforations in the bottom of said U-shaped formation; the projecting tips of said length of sheet metal strip being bent outwardly with respect to one another against the inside surface of said U-shaped formation.

8. The windshield defined in claim 8 wherein said moulding strip comprises two cavities extending along the length of said moulding strip, one of said cavities communicating with said slot thereby defining a narrow relatively deep channel for receiving said band portion of said screen member.

9. The windshield defined in claim 8 wherein said U-shaped formation is formed of a generally flat, perforated bottom surface depending from two lateral outwardly flaring surfaces which meet the outside surface of said snowmobile nose; the perforations in said bottom surface being spaced apart so as to correspond with the spacing of said perforations of said screen member.

10 A moulding strip for mounting a screen member at a predetermined angle on the outside surface of a receiving wall, said moulding strip being shaped as a elongated element having a generally constant cross section and comprising a lower portion integral with an upper portion along a longitudinal plane through said moulding strip; said lower portion comprising two lateral walls flaring outwardly and projecting towards said upper portion, said upper portion presenting an external surface which extends along the length of said moulding strip but which projects beyond said lateral walls whereby to overhand the sides of said lower portion; said external surface presenting an elongated and narrow slot which communicates with a relatively deep cavity within said elongated element whereby to enable the lower band portion of said screen member to be disposed within said moulding strip; the length and width of said slot corresponding generally to the associated dimensions of said base portion of said screen member.

11. The moulding strip defined in claim 11, made of rubber material, wherein said external surface is transversally curved downwardly whereby to terminate the sides of said upper portion with two thin sealing lip portions.

12. The moulding strip defined in claim 12 wherein said lower portion of said elongated element incorporates a series of spaced-apart longitudinally aligned slits for receiving the leg portions of mechanical fasteners.

13. A method of assembling a windshield on a snowmobile cowl comprising the steps of:
  a. disposing the middle portion of a length of sheet metal strip in each perforation of the windshield screen member said perforations being distributed along the base portion of said screen member, and folding the lateral portions of each length against the screen member towards the nearest edge of said screen member;
  b. inserting the base portion of said screen member in the receiving groove of a moulding strip, with the ends of the lateral portions of said lengths projecting through the bottom of said receiving groove;

c. disposing the assembly of said screen member moulding strip and lengths of metal strip along a given line on the surface of the snowmobile cowl, with said lateral portions projecting through respective slots in the wall of said snowmobile cowl; and d. bending the tips of said lateral portions of each said length away from one another against the inside surface of the wall of said cowl.

14. The method defined in claim 14 wherein said cowl incorporates a U-shaped formation adapted to receive the lower portion of said moulding strip.

15. A moulding strip for mounting a screen member at a predetermined angle on the outside surface of a receiving wall, said moulding strip being shaped as a elongated element having a generally constant cross section and comprising a lower portion integral with an upper portion along a longitudinal plane through said moulding strip; said lower portion comprising two lateral walls flaring outwardly and projecting towards said upper portion, said upper portion presenting an external surface which extends along the length of said moulding strip but which projects beyond said lateral walls whereby to overhand the sides of said lower portion; said external surface presenting an elongated and narrow slot to enable the lower band portion of said screen member to be disposed within said moulding strip; the length and width of said slot corresponding generally to the associated dimensions of said base portion of said screen member, said slot extending through said plane into said lower portion.

* * * * *